UNITED STATES PATENT OFFICE.

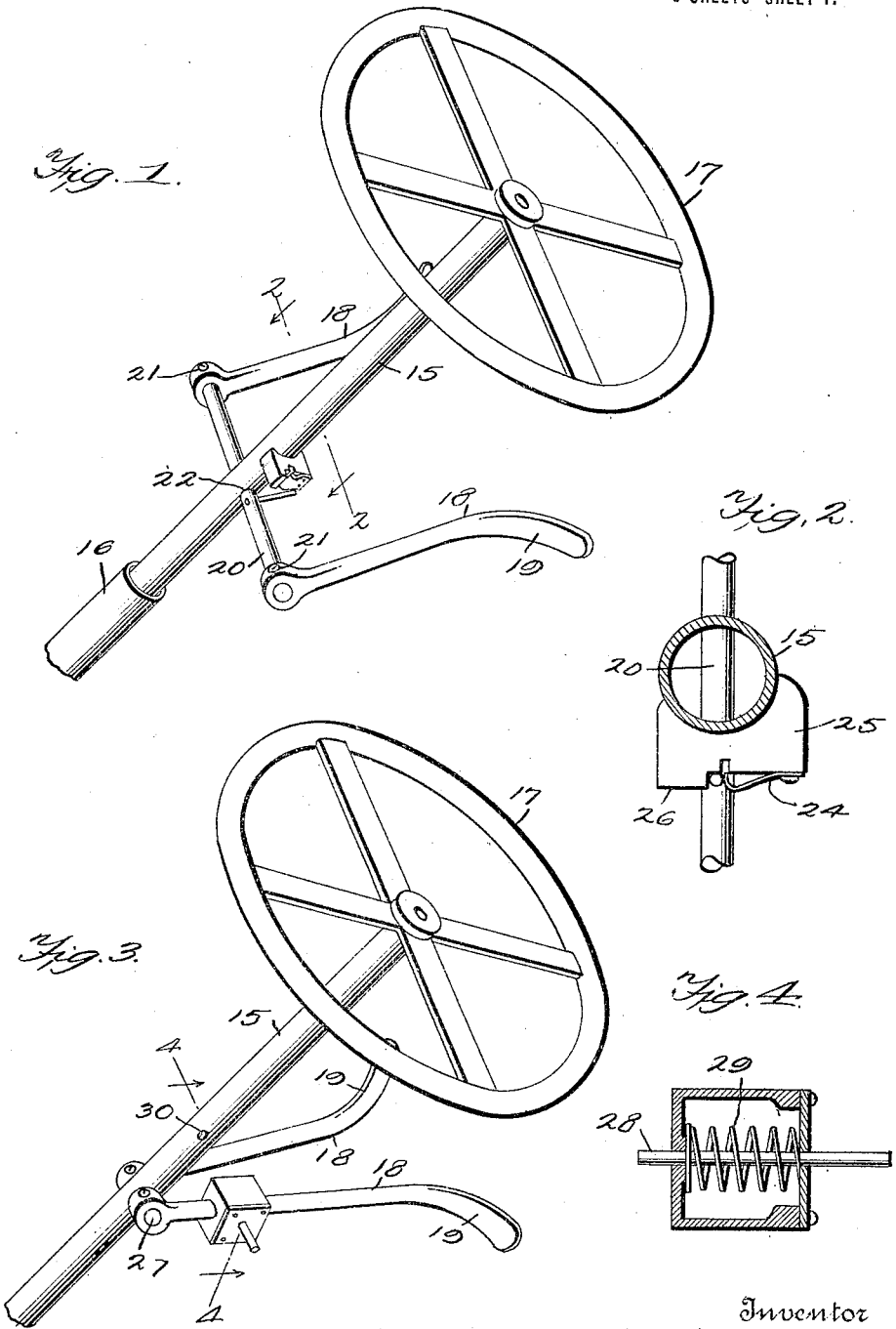

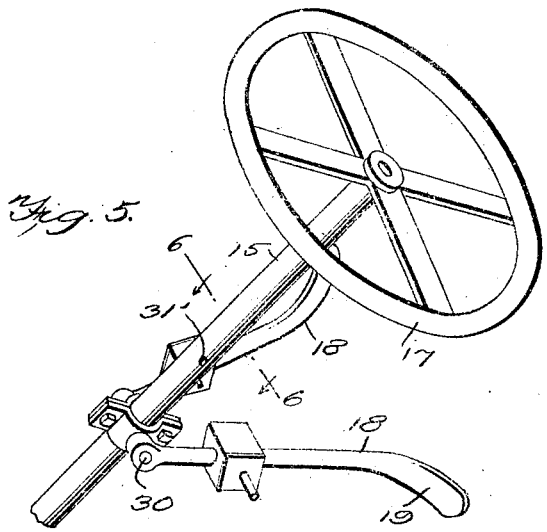
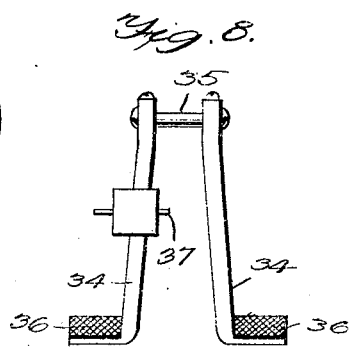
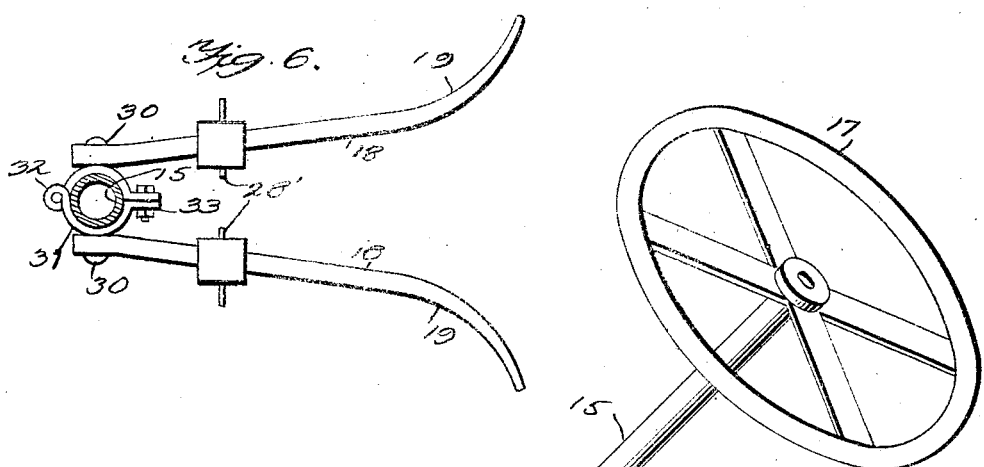
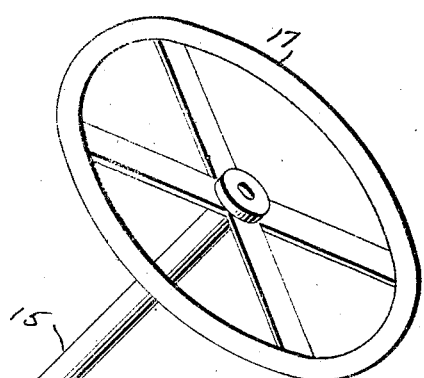
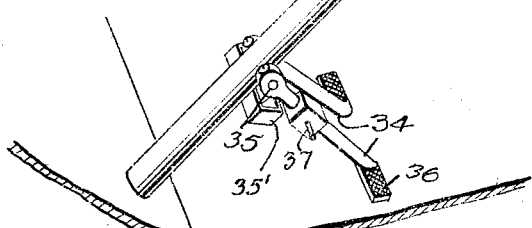

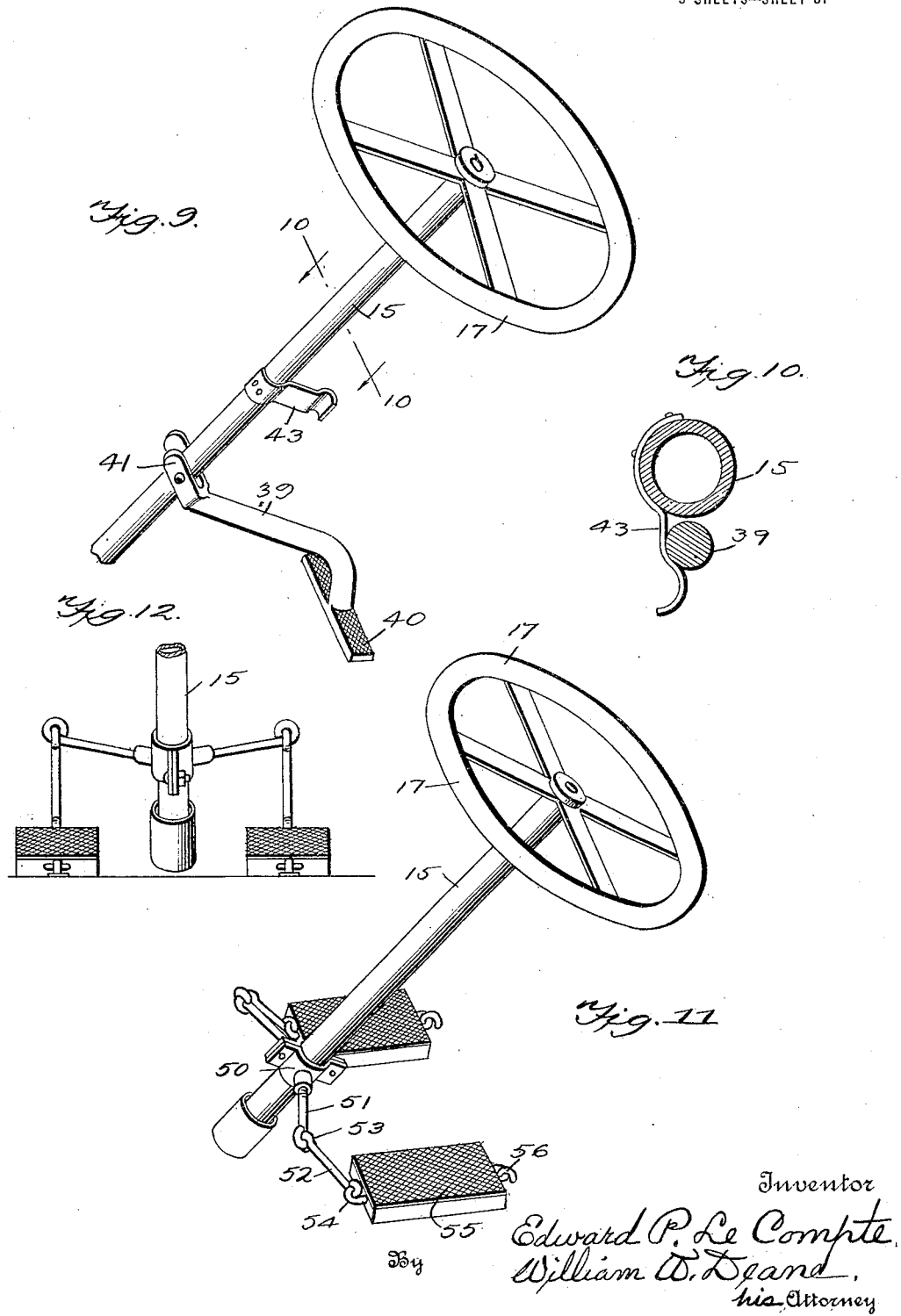

EDWARD P. LE COMPTE, OF PARK CITY, UTAH.

AUXILIARY STEERING MEANS FOR AUTOMOBILE STEERING-POSTS.

1,371,911.  Specification of Letters Patent.  Patented Mar. 15, 1921.

Application filed August 12, 1919. Serial No. 316,952.

*To all whom it may concern:*

Be it known that I, EDWARD P. LE COMPTE, a citizen of the United States, residing at Park City, in the county of Summit and State of Utah, have invented certain new and useful Improvements in Auxiliary Steering Means for Automobile Steering-Posts, of which the following is a specification, reference being had therein to the accompanying drawing.

My invention relates to a device to be secured to the steering post of an automobile or like vehicle, whereby the steering post may be operated by the knees, legs or feet, thereby enabling the operator to remove both hands from the steering wheel, which are then free to be used for other desired purposes.

An important object of the invention is to provide a device of the above mentioned character, which is simple in construction, convenient in use, may be installed upon the steering post of an automobile without materially altering the construction of the same, and may be shifted or folded to an out of the way position when not in use.

Other objects and advantages of the invention will be apparent during the course of the following description.

In the accompanying drawings forming a part of this specification, and in which like numerals are employed to designate like parts throughout the same, Figure 1 is a perspective view of a device embodying my invention, showing the same in use, Fig. 2 is a transverse section taken on line 2—2 of Fig. 1, Fig. 3 is a perspective view of a second form of the device embodying my invention, Fig. 4 is a detail section taken on line 4—4 of Fig. 3, Fig. 5 is a perspective view of a third form of my invention, Fig. 6 is a transverse section taken on line 6—6 of Fig. 5, Fig. 7 is a perspective view of a fourth form of the device, Fig. 8 is a side elevation of the attachment removed, Fig. 9 is a perspective view of a fifth form of the device, Fig. 10 is a transverse section taken on line 10—10 of Fig. 9.

Fig. 11 is a perspective view of a still different form of device embodying my invention, and, Fig. 12 is a side elevation of the same.

In each form of the invention, the numeral 15 designates an inclined preferably tubular steering post of an automobile, journaled in a sleeve 16, and carrying at its upper end a steering wheel 17.

In Figs. 1 and 2, the numeral 18 designates steering elements or arms, embodied in my attachment. These arms are preferably longitudinally curved, for affording recesses 19, for receiving therein the knee or leg of the operator. These arms are provided at their forward ends with openings for receiving a transverse rock shaft 20, and are locked thereto by bolts 21. This rock shaft is arranged horizontally within an opening 22, formed through the steering post 15. It is obvious that the steering arms 18 are disposed upon opposite sides of the post 15, and spaced therefrom for a substantial distance.

When in use, the arms 18 are swung downwardly to a horizontal or inclined position, to be engaged by the knees or legs of the operator, but when these arms are not in use they are swung upwardly to assume a position more or less parallel with the steering post 15. To lock these steering arms in the upper inactive position, I provide a crank-bolt 23, rigidly secured to the rock shaft 20, in proximity to the post 15. This crank-bolt is adapted to engage behind a spring catch 24, carried by a base 25, having a stop 26 for the crank-bolt. The base 25 is rigidly secured to the steering post 15. When the spring catch 24 is depressed the crank bolt 23 can readily clear the same and the steering arms 18 may be shifted to the open or active position.

In Fig. 3 the same steering arms 18 are provided, but they are arranged in contact with the opposite sides of the steering post. These arms are rigidly secured to the opposite ends of a short horizontal rock shaft 27, journaled through an opening in the post 15.

I preferably employ a different form of means to lock the arms 18 in the upper closed position, the same embodying a reciprocatory bolt 28, carried by one arm, and urged inwardly by a spring 29, to enter an opening 30. This bolt may be moved outwardly to release the arms.

In Fig. 5 the same steering arms 18 are employed, but they are pivoted at 30 to sections 31 of a two part clamp. The sections 31 surround the post 15, and corresponding ends thereof are suitably connected at 32, while a bolt 33 adjustably connects the opposite ends thereof. This clamp is rigidly secured to the post 15 to turn therewith.

In connection with this form of the invention, each arm 18 is equipped with a spring pressed bolt 28', similar to the bolt 28, and adapted to enter the opening 31'.

In Fig. 7 I have shown a form of the device adapted to be actuated by the feet of the operator, and the same consists of arms 34 arranged upon opposite sides of the post 15, and rigidly secured to a rock shaft 35, extending horizontally through openings in the post 15. The arms 34 are provided at their free ends with laterally extending pedals 36, to be engaged by the feet of the operator. One arm 34 carries a spring pressed bolt 37, similar to bolt 28, to enter opening 38, when the arms are shifted to the upper inactive position.

In Figs. 9 and 10, the attachment embodies a single steering element or arm 39, having transverse members 40 secured to its outer end, adapted to serve as pedals. The arm 39 is connected at its opposite end with a forked coupling 41, straddling the post 15 and pivoted thereto by a transverse pin.

When the arm 39 is swung upwardly to the inactive position it is held by a spring-catch 43, secured to the post 15, as shown.

In Figs. 11 and 12, the numeral 50 designates a two part clamp, rigidly secured to the steering post 15. This clamp carries horizontal arms 51, which are radial and are pivotally connected at their outer ends with links 52, as shown at 53. These links have their lower ends pivotally connected, as shown at 54, with pedals 55. These pedals are pivotally connected at their rear ends with the floor of the automobile, as shown at 56.

In the use of each form of the invention, shown in Figs. 1 to 10, inclusive, it is obvious that the steering arm or arms may be readily shifted to the lower active position, and engaged by the knees, legs or feet of the operator. By turning these arms in either direction, the steering post 15 may be turned and the automobile properly steered.

The device shown in Fig. 7 is operated by the feet and the downward movement of the arms 34 is limited by a stop 35', thus retaining the pedals 36 spaced from the floor of the automobile.

The device shown in Fig. 9 may be operated by the knees or legs, or the arm 39 may be swung downwardly sufficiently so that the feet may engage the pedals 40.

In the operation of the device, shown in Figs. 11 and 12, the feet may be constantly placed upon the pedals 55, during the normal steering of the wheel 17, and when this wheel is released the post 15 may be turned by depressing the pedals 55.

It is to be understood that the forms of my invention herewith shown and described are to be taken as preferred examples of the same, and that various changes in the shape, size, and arrangement of parts may be resorted to without departing from the spirit of my invention, or the scope of the subjoined claims.

Having thus described my invention, I claim:—

1. The combination with the steering post of an automobile, of a hand wheel secured thereto, and an arm connected with the steering post and extending generally radially therefrom, said arm being operated by the lower limbs whereby the hands of the operator may be freed from the wheel.

2. The combination with the steering post of an automobile, of a hand wheel secured thereto, and separate means to turn the steering post, said means being connected with and wholly supported by the post and shiftable bodily laterally upon the turning movement of the post, said means being further arranged to be operated by the lower limbs of the operator.

3. The combination with a steering post of an automobile having a hand wheel, of a steering arm connected therewith beneath the hand wheel and adapted to be shifted to opened and closed positions, and means to lock the arm in the closed position.

4. The combination with a steering post of an automobile having a hand wheel, of a steering arm connected therewith beneath the hand wheel and adapted to be shifted to opened and closed positions.

5. The combination with a steering post of an automobile having a hand wheel, of a steering arm arranged upon said post beneath the hand wheel, means supported on the post for carrying the arm, and means to lock the arm in one position.

6. The combination with a steering post, of supporting means secured thereto, a steering arm carried by said supporting means and being laterally extended, and means to lock the arm in one position.

7. The combination with a steering post, of a transverse member connected therewith, steering means carried by said transverse member, and coöperating latch devices associated with said steering means and post adapted to hold the steering means in one position.

8. The combination with a steering post, of a steering arm pivotally connected therewith and provided near its free end with a lateral extension, and means to lock the arm to the post.

9. The combination with a steering post, of mounting means secured thereto, steering means carried by the mounting means and means to lock the steering means to the post.

10. The combination with a steering post of an automobile, of radial means extending therefrom and manually operated means carried by the radial means.

In testimony whereof I hereunto affix my signature in the presence of two witnesses.

EDWARD P. LE COMPTE.

Witnesses:
   JAMES BURNS,
   WILLIAM PAUL.